United States Patent [19]
Albrieux et al.

[11] Patent Number: 4,933,952
[45] Date of Patent: Jun. 12, 1990

[54] ASYNCHRONOUS DIGITAL CORRELATOR AND DEMODULATORS INCLUDING A CORRELATOR OF THIS TYPE

[75] Inventors: Vincent Albrieux, Paris; Didier Soufflet, Montrouge, both of France

[73] Assignee: LMT Radioprofessionnelle, Boulogne-Billancourt, France

[21] Appl. No.: 332,968

[22] Filed: Apr. 4, 1989

[30] Foreign Application Priority Data

Apr. 8, 1988 [FR] France ............................... 88 04682

[51] Int. Cl.$^5$ .............................................. H04L 9/00
[52] U.S. Cl. ...................................................... 375/1
[58] Field of Search ............................... 375/1; 380/34

[56] References Cited

U.S. PATENT DOCUMENTS 4,730,340 3/1988 Frazier, Jr. ............................ 375/1

OTHER PUBLICATIONS

Proceedings of the Melecon '87 Mediterranean Electrotechnical Conference, 34th. Congress on Electronics, Joint Conference, pp. 157–161; M. K. Sust et al.: "All Digital Signal Processing in a Spread Spectrum Communication System", *FIG. 2*.
IEEE Transactions on Communications, vol. COM-32, No. 2, Feb. 1984, pp. 199–201.
IEEE, New York, U.S.A.; J. Das: "A Technique for Improving the Efficiency of M-ary Signaling", *FIGS. 1b, 2c*.
IEEE 1983 International Symposium on Circuits and Systems, Newport Beach, Calif., May 2–4, 1983, vol. 2, des 3, pp. 522–525, IEEE; A. Corry et al., "Architecture of a CMOS Correlator", *p. 523, paragraphe: Correlation Algoritym, FIG. 2*.

Primary Examiner—Salvatore Cangialosi
Attorney, Agent, or Firm—Cushman, Darby & Cushman

[57] ABSTRACT

A demodulator to demodulate a complex signal formed by two carriers, in quadrature, the spectrum of which is spread by a pseudo-random signal, and which are modulated by an M-ary, Walsh, code comprises:
  a chain of registers to store 256 bits of a pseudo-random signal;
  a multiplexer to temporally multiplex the processing of the two carriers;
  a chain of correlation macro-cells having a systolic structure enabling temporal multiplexing and having intermediate outputs providing for partial correlation values on 16 chips;
  a device for the computation of linear combinations of the functions of partial correlation, to compute two functions of correlation corresponding to two carriers for each M-ary code;
  a demultiplexing and computation device to compute the module of the function of correlation for each of the Walsh codes which may modulate the signal to be demodulated;
  a device for the selection of the greatest value of the correlation functions and for the selection of the corresponding piece of data.

6 Claims, 7 Drawing Sheets $$S5 = \sum_{i=0}^{15} Ri \cdot X(i+5) + Ci$$

ASYNCHRONOUS DIGITAL CORRELATOR AND DEMODULATORS INCLUDING A CORRELATOR OF THIS TYPE

BACKGROUND OF THE INVENTION

1. Field of the Invention

The invention concerns an asynchronous digital correlator and demodulators having a correlator of this type.

This correlator enables the processing of a complex signal formed by a first carrier and a second carrier, I and Q, modulated by a pseudo-random function to spread the spectrum and modulate it by an M-ary orthogonal code. A complex signal of this type results, for example, from a PSK, MSK or APSK type modulation with spectrum spreading, and modulation by Walsh codes. The demodulation of a signal of this type makes it necessary to compress its spectrum by means of a pseudo-random function identical to the one thathas been used to spread this spectrum, and then consists in recognizing a transmitted item of data in identifying the modulating among M possible codes. These two operations can be done by means of a correlator.

2. Description of the Prior Art

At present, there are no correlators that can be used to correlate a complex signal with a reference signal on a great length, such as one of 256 chips, while having, at the same time, a structure that is simple enough to enable the making of a demodulator which can be integrated in a single integrated circuit. Prior art types of correlators are designed for frame recognition rather than for demodulation. A first type of prior art correlator device, commercially available in the form of an integrated circuit, works only on 64 chips. A second known type of correlator, commercially available in integrated circuit form, works on 256 chips and has no intermediate outputs giving partial correlation values relating to a smaller number of chips.

Known correlators have a large number of 64-chip or 256-chip correlators: they have a chain of four 64-chip correlators, or one 256-chip correlator for the carrier I; and a chain of four 64-chip correlators or one 256-chip correlator for the carrier Q, for each of the M-ary codes. Since number M may be equal to 16, the number of integrated circuits may reach 128.

SUMMARY OF THE INVENTION

An aim of the invention, therefore, is to propose an asynchronous digital correlator that enables the making, notably, of simpler demodulators which may possibly be integrated in a small number of integrated circuits or even in a single integrated circuit. An object of the invention is a correlator with a systolic structure wherein the computations for the carrier I and the carrier Q are temporally multiplexed, said structure being divided in such a way that it gives values of the modulus of a partial correlation function computed on far smaller lengths than the total correlation length, to enable recognition of the codes by means of a relatively simple arithmetic code computing linear combinations of these moduluses.

According to the invention, there is proposed an asynchronous, digital correlator to correlate a binary reference signal (REF) with a complex signal formed by a first carrier and second carrier (I, Q), modulated by a pseudo-random function and by an M-ary orthogonal encoding, said two carriers being sampled and digitized, said correlator comprising:

a multiplexer to transmit, alternately, a value (I) of the first carrier, and a value (Q) of the second carrier, with a period equal to half their sampling period;

a first digital filter adapted to the pseudo-random function (PN), comprising a chain of registers to store L consecutive bits of the reference signal (REF) and a chain of M correlation macro-cells receiving the sequence of multiplexed values of the first carrier and the second carrier (I and Q), each macro-cell computing the value (CPI0,..., CPI15) of a first function, called a partial correlation function, between N bits of the reference signal and N values of the first carrier (I), and then computing the value (CPQ0,..., CPQ15) of a second function, called a partial correlation function, betweenn N bits of the reference signal and N values of the second carrier (Q), N being equal to L/M;

a second digital filter adapted to at least one of the M-ary encoding codes and having computation means to determine the value of at least one linear combination of the values of the first functions of partial correlation (CPI0,... CPI15); and then to determine the value of a linear combination of the values of the second functions of partial correlation (CPQ0,..., CPQ15), the coefficients of the linear combination being unchanged and being equal to ±1; and having means to demultiplex the values of the two linear combinations (FIi, FQi), and to determine the modulus (Fi) of a vector having, as its components, the values of these two linear combinations (FIi, FQi).

BRIEF DESCRIPTION OF THE DRAWINGS

The invention will be better understood and other details will emerge from the following description and the accompanying figures, of which.

DETAILED DESCRIPTION OF THE INVENTION

Figure 1:
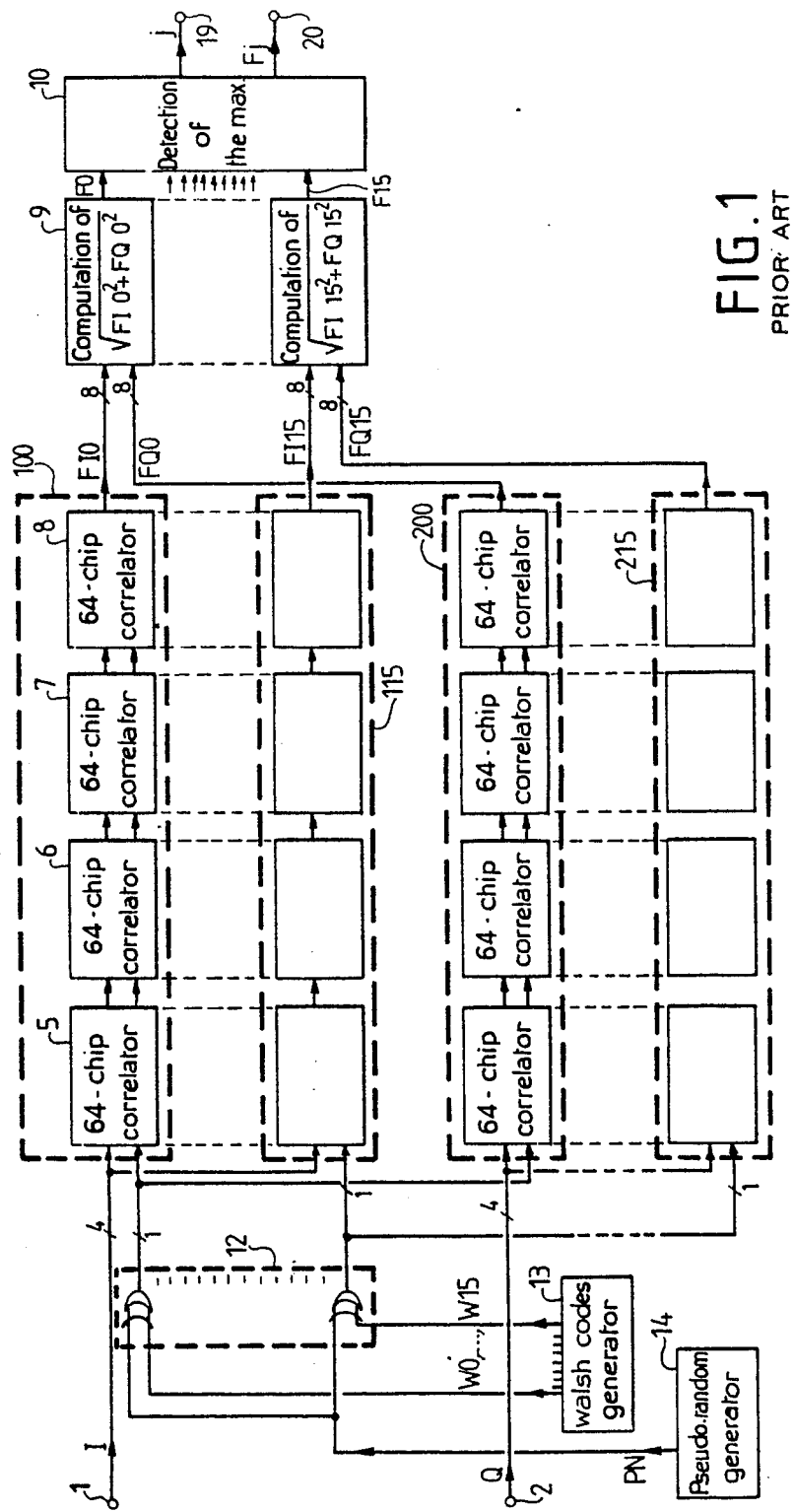
FIG. 1 is a block diagram of an exemplary embodiment of a prior art demodulator.

The prior art demodulator, shown in FIG. 1, has:

two input terminals 1 and 2, respectively receiving the digital values of two carriers, I and Q, which are modulated by a pseudo-random function and by an M-ary orthogonal code, and which are sampled and digitized;

a Walsh codes generator 13, having 16 outputs, respectively giving 16 binary signals corresponding to 16 Walsh codes, and referenced W0, ...W15;

a generator 14 giving a pseudo-random binary signal PN, identical to the one that has been used to spread the spectrum of the two carrier waves I and Q;

sixteen chains of correlators 100 to 115 to correlate the carrier I with the sixteen reference signals, each chain such as the chain 100 having four correlators 5 to 8, each operating on 64 chips and being formed by an integrating circuit;

sixteen chains of correlators, 200 to 215, to correlate the carrier Q with the 16 reference signals, each chain being identical to the chain 100;

a set 9 of sixteen devices of the modulus of a two-component vector;

a device 10 for the detection of the maximum among 16 values.

It is also possible to form each of the chains 100 to 115 and 200 to 215 by means of a single correlator integrated circuit working on 256 chips.

The chains of correlators 100 to 115 respectively give digital values F10 to F115, which are the values of the functions of correlation of the carrier 1, respectively with the sixteen reference signals, on 256 chips. The outputs of the chains of correlators, 200 to 215, respectively give values FQ0 to FQ15 which are the values of the functions of correlation of the carrier Q, respectively with the sixteen reference signals on 256 chips. Each of the computing devices of the set 9 computes the modulus of a vector having, as its components, a value of the function of correlation of the carrier 1 with a reference signal corresponding to a code and a value of the function of correlation of the carrier Q with the same reference signal. For example, a computing device of the set 9 computes the square root of $F10^2 + FQ0^2$.

The set 9 gives the sixteen values, F0 to F15 of the moduluses of the functions of correlation of the complex signal formed by the carrier I and the carrier Q, correlated with the sixteen reference signals. The sixteen vales F0 to F15 are compared with one another by the device 10. This device 10 gives an output terminal 19 the index j of the correlation function with the greatest modulus. This index j designates the code that modulates the carriers I and Q. The device 10 also gives the value Fj of the modulus to a output terminal 20.

This prior art demodulator is complex and bulky because there are 32 correlation chains in parallel.

Figure 2:
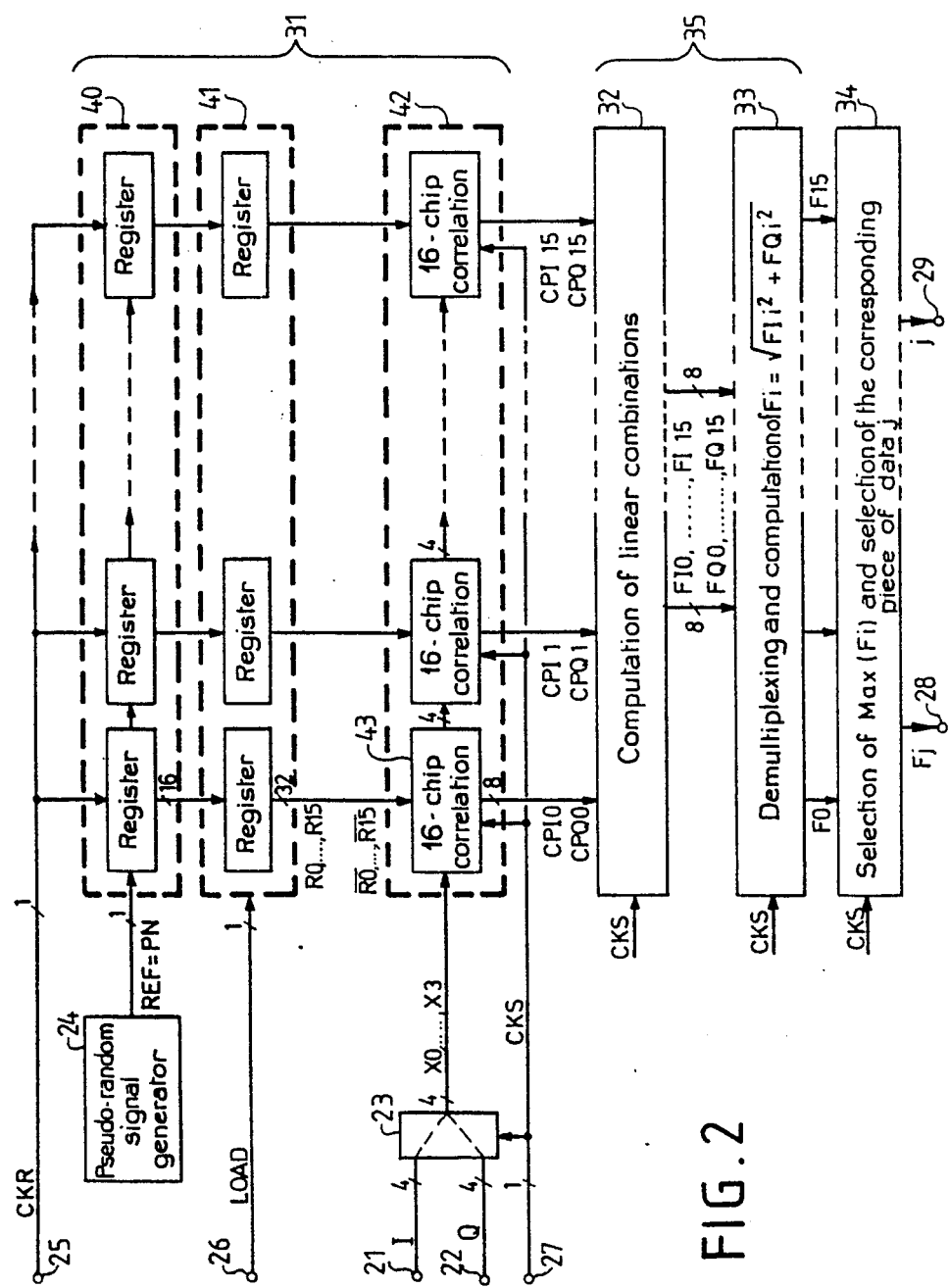
FIG. 2 is a block diagram of an exemplary embodiment of a first type of demodulator including a correlator according to the invention.

FIG. 2 is a block diagram of an exemplary embodiment of a demodulator of a first type, having a correlator according to the invention. This demodulator has five sub-units:

a multiplexer 33 to transmit, alternately, a value of the carrier I and a value of the carrier Q, at a rate which is twice their sampling frequency;

a first digital filter 31, adapted to the pseudo-random function, which spreads the spectrum of the carriers I and Q;

a second digital filter 35, matched to the sixteen Walsh codes which can modulate the carriers I and Q to transmit a piece of data; this latter filter computes sixteen values of moduluses of correlation functions, F0 to F15, corresponding to sixteen Walsh codes;

a device 34 selecting the maximum among these sixteen values, and giving the maximum value Fj to an output terminal 28 and giving the index j, which identifies the modulating code, at an output terminal 25.

The first digital filter 31 has:

a generator 24 giving a pseudo-random signal PN, identical to the one used to spread the spectrum of the complex signal to be demodulated;

a chain of shift registers 40, having a total of 256 stages;

a set 41 of sixteen independent registers, each giving, in parallel, sixteen bits and their complements;

a chain 42 of sixteen correlation macro-cells, each computing a value of a partial correlation function on sixteen bits;

a multiplexer 23 having two data inputs, one output and one control input.

The pseudo-random signal PN is a reference signal, REF, for demodulation. The bits of the signal REF are stored and shifted, one by one, in the chain of registers 40 under the control of a clock signal CKR, at the rate at which they are created by the generator 24. The signal CKR is given to an input terminal 25 by a standard generator of clock signals, not shown in the figure. The chain of registers 40 stores 256 bits of the reference signal. The content of these registers is transferred as a block into the chain of registers 40, under the control of a clock signal, LOAD, in synchronism with the clock signal CKS. The period of the signal LOAD is, for example, 10 mS, while that of CKR is, for example, 30 nS. The clock signal LOAD is given to an input terminal 26 by a standard generator of clock signals, not shown in the figure.

The multiplexer 23 is a multiplexer with two inputs and one output. Its inputs are respectively connected to input terminals 21 and 22, receiving the carriers I and Q to be demodulated, in the form of digital values encoded on four bits, the negative values being encoded in the two's complement system. The output of the multiplexer 23 gives a value formed by four bits: X0, ..., X3 to an input of the chain 43, with sixteen correlation macro-cells. The multiplexer 23 and the correlation macro-cells are controlled by a clock signal CKS at a rate which is twice the sampling rate of the carriers I and Q. The clock signal CKS is given to an input terminal 27 by a standard generator of clock signals, not shown in FIG. 2.

The first correlation cell in the chain 42 is a cell 43 which receives the four bits X0, ..., X3, alternately representing a value of the carrier I and a value of the carrier Q, and which receives 32 bits R0, ..., R15, $\overline{R0}$ ..., $\overline{R15}$, representing sixteen bits of the reference signal stored in a register of the chain 41. The macro-cell 43 retransmits the four bits X0, X3 to a following macro-cell, with a delay respectively equal to 16, 17, 18, 19 periods of the clock signal CKS, and respectively gives a value CPI0 of the partial correlation function corresponding to the signal I, then a value CPQ0 of the partial correlation function corresponding to the signal Q.

Each macro-cell is identical to the macro-cell 43 and has: a sixteen bit input receiving sixteen successive bits of the reference signal and sixteen complementary bits; a four bit input receiving a value of the sequence of multiplexed values of the carriers I and Q; an output retransmitting the four bits of this value to the following macro-cell, with a delay respectively equal to 16, 17, 18, 19 periods of the clock signal CKS; and an eight bit output successively giving the value of a first partial correlation function, corresponding to the carrier I, then the value of a second partial correlation function corresponding to the carrier Q, said output being connected to an input of the linear combinations computing device 32.

The chain of correlators 42 has 16 eight-bit outputs respectively giving sixteen values of partial correlation functions: CPI0, CPI15, corresponding to the carrier I; and then respectively giving sixteen values of partial correlation functions: CPQ0, CPQ15, correspondig to the carrier Q.

The filter 35 has: a device 32 for the computation of linear combinations and a demultiplexing and modulus computing device 33. The device 32 computes, on 256 chips, the value FIi of the function of correlation of the carrier I with the pseudo-random signal PN and with each Walsh code Wi, for i=0 to 15; and then computes, on 256 chips, the value FQi of the function of correlation of the carrier Q with the pseudo-random signal PN and each Walsh code Wi for i=0 to 15, in combining the values CO10, ..., CPI15., respectively CPQ0, CPQ15 of the partial functions of correlation, on sixteen chips of the carrier I and the carrier Q respectively, with the reference signal REF. It must be noted that, in this demodulator, the reference signal REF is formed solely by the pseudo-random signal PN, contrary to the reference signals used in the prior art device shown in FIG. 1.

The device 32 is a "pipeline" structure device controlled by the clock signal CKS. It has two eight-bit outputs, respectively giving values FI0, ..., FI15 which are values of the function of correlation of the signal I with the reference signal and with the sixteen Walsh codes respectively; then respectively giving values FQ0, ..., FQ15 which are values of the function of correlation of the signal Q with the reference signal and with sixteen Walsh codes respectively.

The device 33 computes the modulus Fi of the function of correlation, on 256 chips, of the complex signal to be modulated wth the pseudo-random signal and with each Walsh code Wi for i=0 to 15.

The device 33 receives and then demultiplexes the values FIi and FQi, for i=0 to 15, and computes the modulus Fi of a vector having, as its component, FIi and FQi, in determining the square root of $FIi^2+FQi^2$. The device 33 has sixteen outputs giving, respectively, the values F0, F15, to sixteen inputs of the device 34. The device 34 selects the greatest value, marked Fj, among the values Fi for i=0 to 15, and selects the corresponding index j. This index j designates the Walsh code which is detected by the demodulator. In other words, it designates the piece of data which is transmitted by the signals I and Q. The devices 32, 33 and 34 are also controlled by the clock signal CKS.

Figure 3:
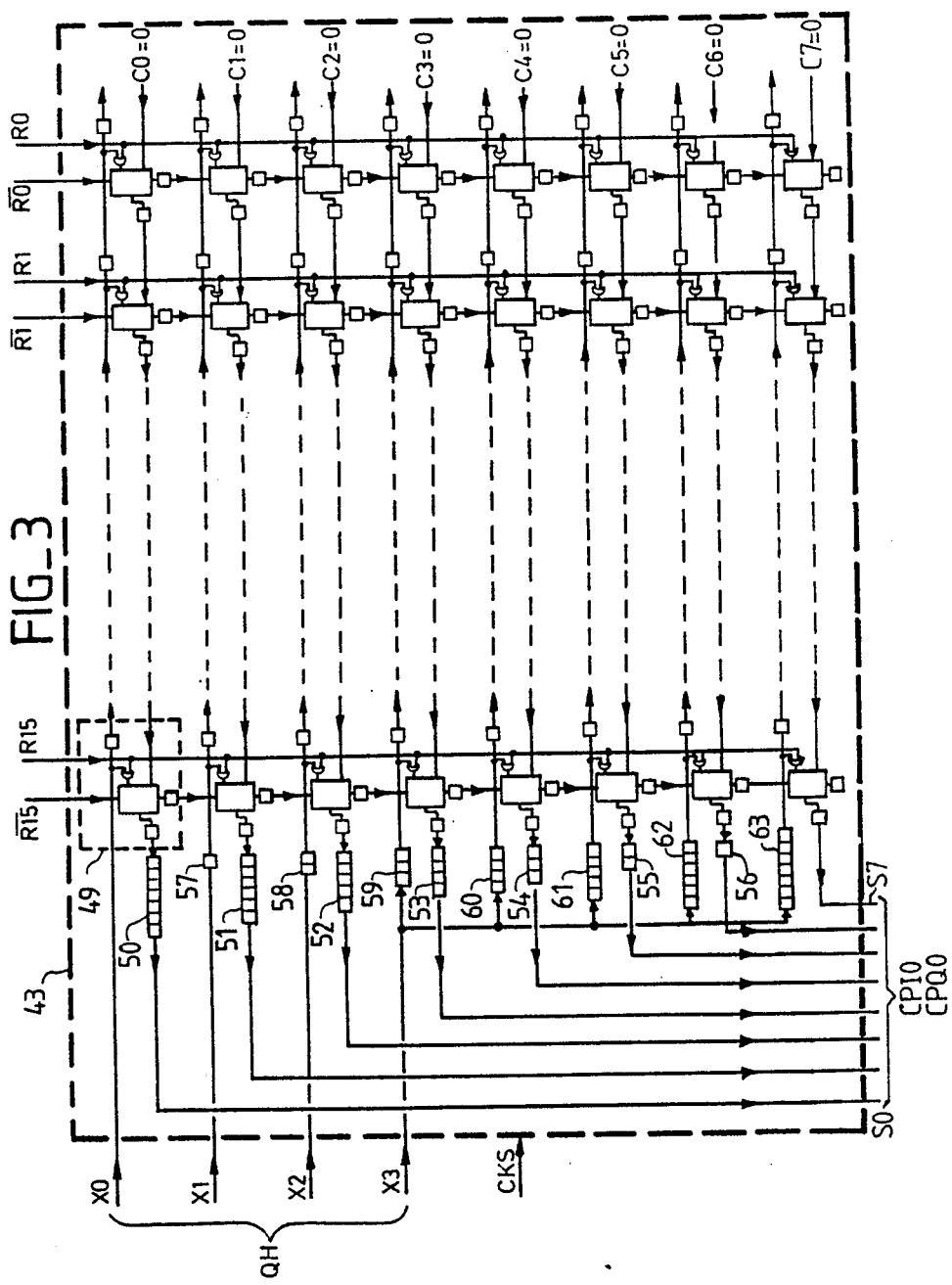
FIG. 3 shows a more detailed block diagram of a correlation macro-cell constituting this exemplary embodiment.

FIG. 3 shows a block diagram of the macro-cell 43. The other macro-cells of the chain 42 are identical to the macro-cell 43. Each macro-cell has a systolic structure formed by a matrix of 128 identical cells working on a single bit. This matrix has eight rows of sixteen cells. The first cell 49, of the first row of cells, receives a bit X0 of a first value from the carrier I or Q. This bit X0 is propagated from one cell to another of the first row, each delay being equal to a clock signal CKS period. The first cell of the second row of the matrix receves the bit Xl with a delay equal to the clock signal CKS period, with reference to the bit X0. This delay is got by a D-type flip-flop 57. The cells of the second row retransmit the bit Xl, each with a delay equal to a clock signal CKS period.

The first cell of the third row receives the bit X2 with a delay equal to two clock signal CKS periods: this delay is obtained by a set 58 formed by two D-type flip-flops. The cells of the third row retransmit the bit X2, each with a delay equal to one clock signal CKS period. The first cell of the third row receives the bit X3 with a delay equal to three clock signal CKS periods. This delay is got by a set 59 of three D-type flip-flops. The cells of the third line retransmit the bit X3,. each with a delay equal to a clock signal CKS period.

The first cell of the fourth row receives the bit X3 with a delay equal to three clock signal CKS periods: this delay is got by a set 59 of three D-type flip-flops. Each cell of the fourth row retransmits the bit X3 with a delay equal to a clock signal CKS period.

The first cell of the fifth line receives the bit X3 with a delay equal to four clock signal CKS periods. This delay is got by a set 60 of four D-type flip-flops. Each cell of the fifth line retransmits the X3 with a delay equal to a clock signal CKS period. The first cell of the eighth row receives the bit X3 with a delay equal to seven periods of the clock signal CKS. This delay is obtained by a set 63 of seven D-type flip-flops. Each cell of the eighth row retransmits the bit X3 with a delay equal to a clock signal CKS period. The first cell of the sixth line receives the bit X3 with a delay equal to five clock signal CKS periods. The delay is got by a set 61 of five D-type flip-flops. Each cell of the sixth row retransmits the bit X3 with a delay equal to a clock signal CKS period. The first cell of the seventh row receives the bit X3 with a delay equal to six periods of the clock signal CKS. This delay is got by a set 62 of six D-type flip-flops. Each cell of the seventh row retransmits the bit X3 with a delay equal to one clock signal CKS period. The last cell of each line therefore gives one of the bits X0, Xl, X2, X3, with a delay which depends on the order of the row, to an input of the following macro-cell in the chain 42.

Each cell has an input receiving one partial correlation result bit, given by an output, called a partial correlation result output, belonging to the next cell. In this example, the capacity of a macro-cell is never exceeded. Consequently, there is no provision for transmitting result bits from one macro-cell to another. The inputs of the partial correlation result bits of the last cells respectively receive bits C0,..., C7 having null value.

All the cells of the first column, all the cells of the second column, etc., respectively receive the bits R15 and $\overline{R15}$,..., RO and $\overline{RO}$, of the reference signal. A carry-over input, of the first cell of the first column, receives the bit $\overline{R15}$, and gives a carry-over bit to the next cell in the same column. The next cell, in turn, gives a carry-over bit to a next cell, each time with a delay equal to a clock signal CKS period. Similarly, in the following columns, a carry-over input of the first cell respectively receives $\overline{R14}$, ..., $\overline{RO}$, and the cells of the following rows give carry-over bits to the cells of the following row.

The partial correlation result output of each cell of the first column gives a correlation result bit on 16 chips. The first cell of the first row gives a bit SO, through a set 50 of seven D-type flip-flops giving a delay equal to seven clock signal CKS periods. The first cell of the second row gives a bit S1 through a set 51 of six D-type flip-flops giving a delay equal to six periods of the clock signal CKS. The first cell of the third row gives a bit S2, through a set 52 of five D-type flip-flops giving a delay equal to five clock signal CKS periods. The first cell of the fourth row gives a bit S3 through a set 53 of four D-type flip-flops, giving a delay equal to four periods of the clock signal CKS. The first cell of the fifth row gives a bit S4 through a set 54 of three D-type flip-flops giving a delay equal to three clock signal CKS periods. The first cell of the sixth row gives a bit S5 through a set 55 of two D-type flip-flops giving a delay equal to two clock signal CKS periods. The first cell of the seventh row gives a bit S6 through a D-type flip-flop 56 giving a delay equal to one clock signal CKS period. The first cell of the eighth row directly gives a bit S7.

Figure 4:
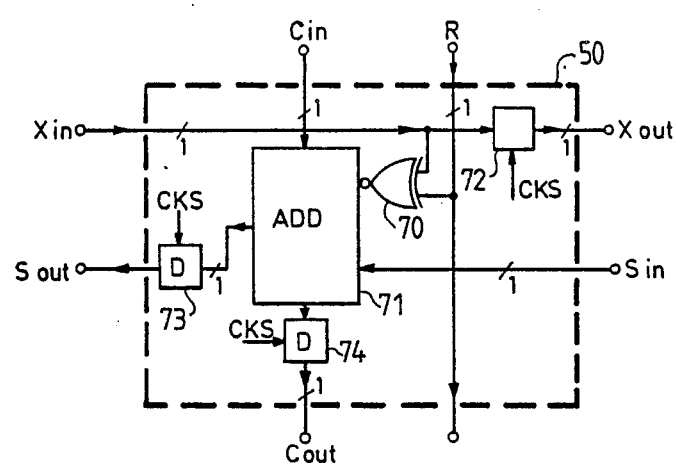
FIGS. 4 and 5 are partial diagrams of this macro-cell.
Figure 5:
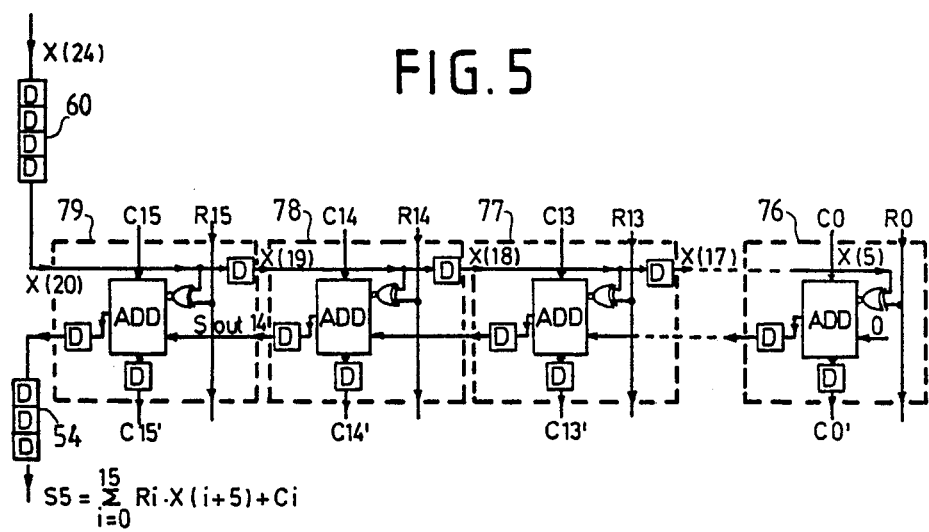

FIG. 4 is a more detailed block diagram of one of the cells 50 of the correlation macro-cell 43. The cell 50 has:

an exclusive-NOR gate 70 with a first bit receiving reference signal bit R, said bit being further transmitted without modification to the next cell in the same column, and having a second input receiving a bit Xin with a value of carrier I or carrier Q;

an adder 71 having a first input which receives a bit Sin which is a partial correlation result given by the following cell on the same row and having a second input connected to the output of the gate 70;

a first D-type flip-flop 72, having an input receiving the bit Xin; having a control input receiving the clock signal CKS; and having an output giving a bit Xout which is the preceding value of the bit Xin to the next flip-flop on the same row;

a second D-type flip-flop 73 having an input connected to the output of the adder 71; having a control input receiving the clock signal CKS; and having an output giving a bit Sout which is a partial correlation result constituting a bit of the value of one of the functions of partial correlation of the carriers I and Q;

a third D-type flip-flop 74 having an input connected to a carry-over output of the adder 71; having a control input receiving the clock signal CKS and having an output giving a bit Cout which is the carry-over for the next cell in the same column;

FIG. 5 illustrates the operation of a row of the matrix of cells of the macro-cell 43 for the computation of the value of the bit S5 of the function of partial correlation of the carrier I or Q. This row consists of sixteen cells 79, 78, 77,...., 76. At the instant considered, the first cell 79 receives the bit X (20) given by the output of the set 60 of four D-type flip-flops. At the same instant, this set 60 receives a bit X (24) at its input. The bits X are successively retransmitted by each of the cells of the row in adding, each time, a delay equal to a clock signal CKS period. Consequently, the cells of the row respectively receive the bits X(20), X(19), X(18), X(17) X(5), at the instant considered. These values are respectively applied to the exclusive-NOR gates of each of the cells to obtain the product of these bits with the bits R15,..., R0 of the reference signal. In each cell, the result of the product is applied to the first input of the adder which adds to it the value of a carry-over bit given by the homologous cell in the preceding row and which also adds to it the partial correlation result bit given by the next cell on the same row. For example, in the cell 79, the carry-over bit C15 is added to the result of the product X(20).R15 and to the bit Sout 14.

The second input of each adder receives a partial correlation result bit given by the output of the adder of the following cell through a D-type flip-flop. Each flip-flop further gives a carry-over bit, C15',..., C0' respectively, to the cells of the following row. The output of the adder of the first cell 79 gives the value of the bit S5 through a D-type flip-flop that its cell has, and through the set 54 of three D-type flip-flops giving a delay equal to two periods of the clock signal CKS. The value of the bit S5 is thus equal to the sum of Ri X(i+5)-+Ci, for i=0 to 15.

Figure 6:
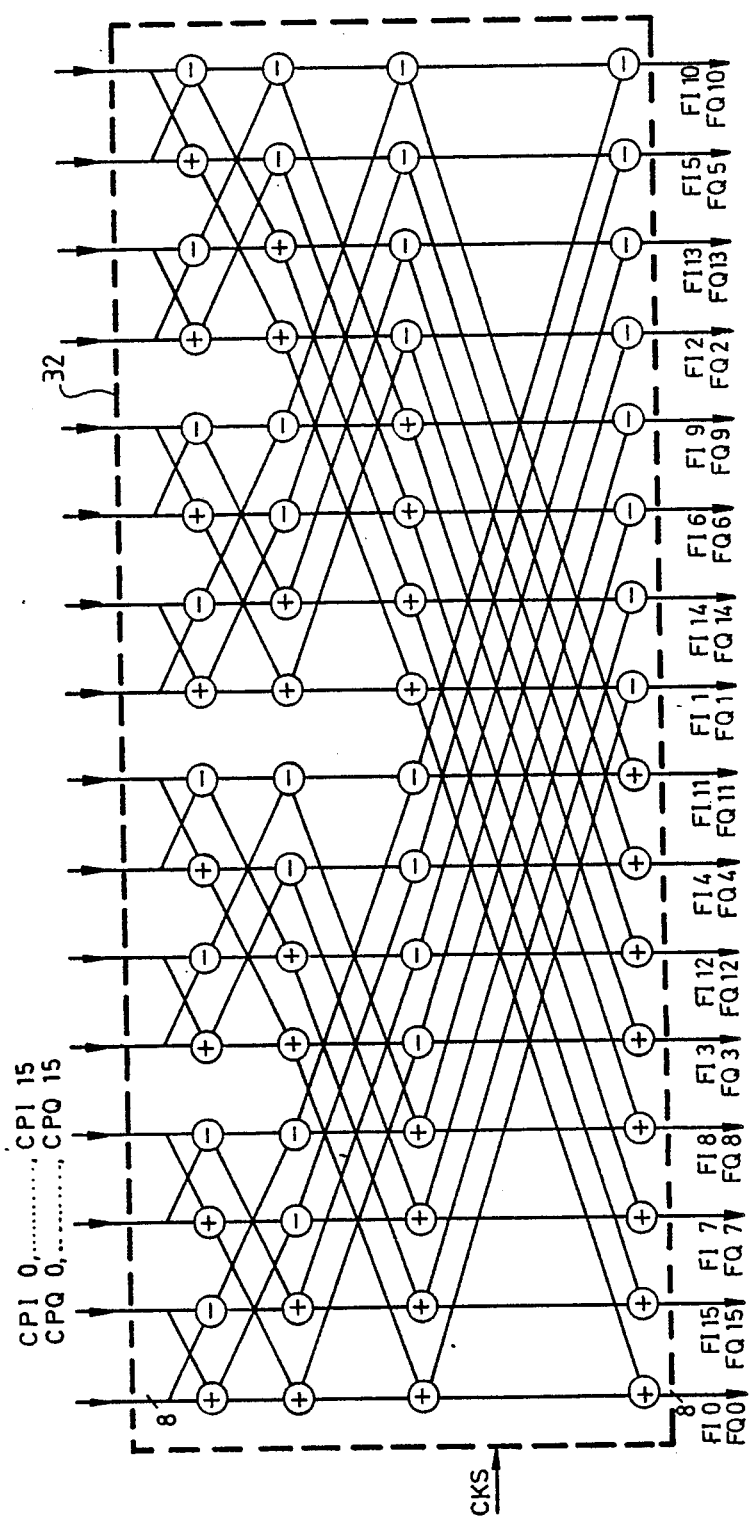
FIG. 6 is a block diagram of a computing device belonging to this exemplary embodiment.

FIG. 6 shows a block diagram of the linear combinations computing device 32, successively determining a value of a first partial correlation function for the signal I, and then a value of a second partial correlation function for the signal Q, for the 16 Walsh codes. The device 32 has 16 inputs, respectively receiving CPI0,..., CPI15 in this order; then CPQ0,..., CPQ15 in this order. This device 32 has a "pipeline" structure comprising four rows of operators, each operator computing a linear combination of two intermediate values determined by two operators of the preceding row. Each operator is: either an adder followed by a register or a subtractor followed by a register. The registers are controlled by the clock signal CKS.

The first row is formed by pairs of operators: an adder and a subtractor, taken in this order, and respectively computing the sum and the difference of two values, applied respectively to two neighbouring inputs of the device 32.

The operators of the second row form four identical groups, each having two adders and then two subtractors. Each of the adders adds the value given by the operator located on top of it and the intermediate value given by the operator located two ranks further on in the row above. Each subtractor computes the difference between the intermediate value given by the operator located on top of it and the intermediate value given by the operator located two ranks before it on the previous row.

The operators of the third row form two identical groups, each having four adders and then four subtractors. Each adder computes the sum of the intermediate value given by the operator located on top of it and the intermediate value given by the operator located four ranks further on in the previous row. Each subtractor computes the difference between the intermediate value given by the operator on top of it, and the intermediate value given by the operator located four ranks before it on the previous row.

The fourth row of operators is formed by eight adders and then eight subtractors. Each adder computs the sum of the intermediate value given by the operator located on top of it and the intermediate value given by the operator located eight ranks further on in the previous row. Each substractor computes the difference between the intermediate value given by the operator on top of it, and the intermediate value given by the operator located eight ranks before it on the previous row. The outputs of the eight adders and eight subtractors of the fourth line respectively give the values FI0, FI15, FI7, FI8, FI3, FI12, FI4, FI11, FI1, FI14, FI6, FI9, FI2, FI13, FI5, FI10 of the function of correlation of the carrier I, and then give the values FQ0, FQ15, FQ7, FQ8, FQ3, FQ12, FQ4, FQ11, FQ1, FQ14, FQ6, FQ9, FQ2, FQ13, FQ5, FQ10 of the function of correlation of the carrier Q.

Figure 7:
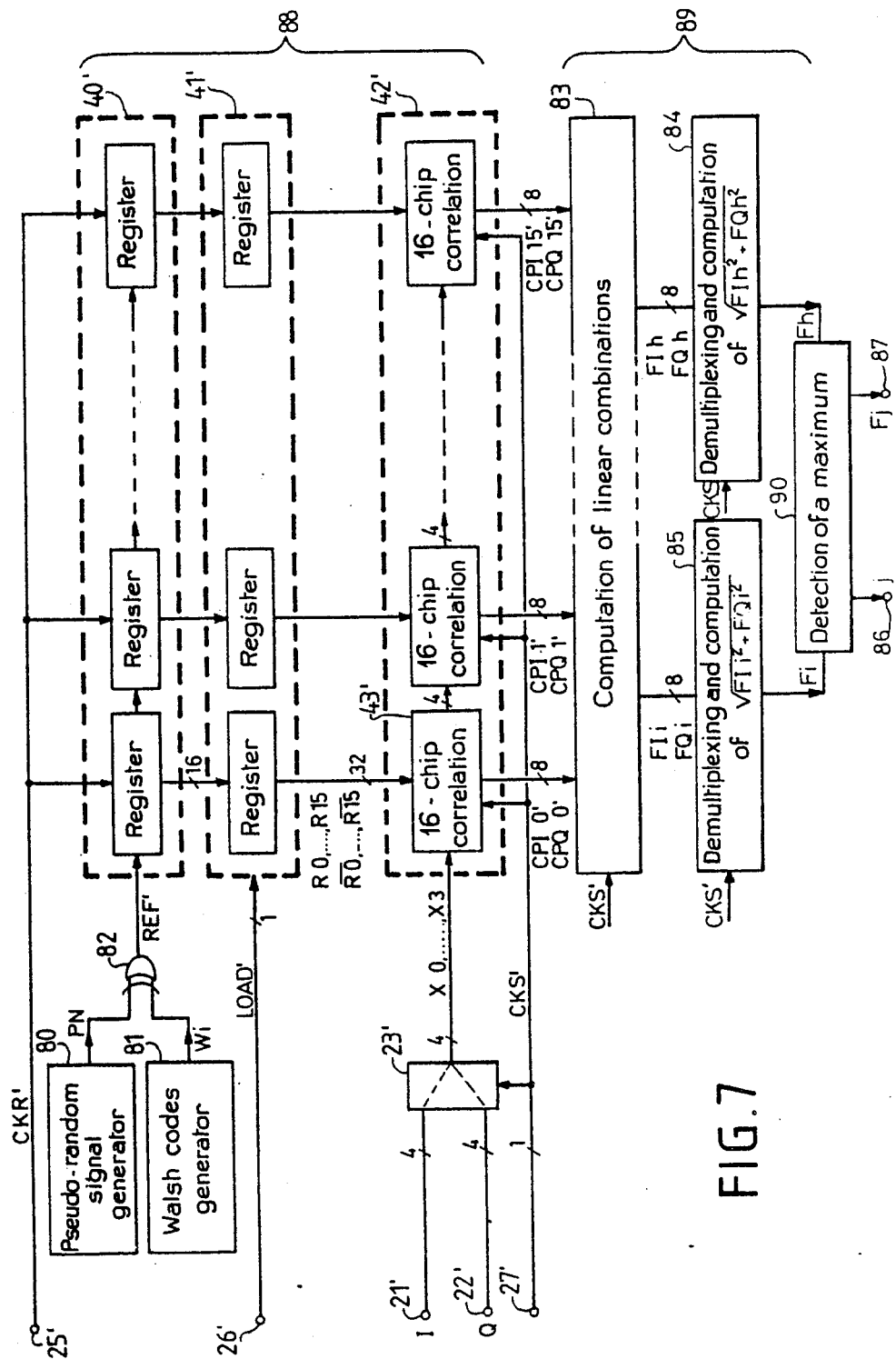
FIG. 7 shows a block diagram of an exemplary embodiment of a second type of demodulator including a correlator according to the invention.

FIG. 7 shows a block diagram of an exemplary embodiment of a second type of demodulator which also has a correlator according to the invention. The elements identical to the elements of the first exemplary embodiment carry the same reference but have the index '. This exemplary embodiment includes a first digital filter 88 including, notably: two chains of registers 40 and 41', a multiplexer 23'and a chain 32'of correlation macro-cells identical to the above-described elements.

The reference signal REF' is different from the signal REF. It is given by the output of an exclusive-OR gate 82, which achieves the product of a pseudo-random signal PN and a Walsh code signal Wi. A generator 80 gives the pseudo-random signal PN which is identical to the one that has been used to modulate the signals I and Q to be demodulated. A generator 81 gives the Walsh code signal Wi. In this latter type of demodulator, the reference signal REF' is thus adapted to a Walsh code chosen from among the M possible codes. This particular feature enables the second filter adapted to the Walsh encoding.

The filtering adapted to the Walsh encoding is achieved by an adapted filter 89 comprising:
a linear combinations computing device 83,
a device 85 for demultiplexing, and for computing the function of correlation for the Walsh code Wi; and a device 84 for demultiplexing and for the computing of the function of correlation for another Walsh code Wh, which is related to the code Wi. The index h is related to the index i by the following relationship: h=M-i.

For example, if the generator 81 gives the Walsh code W0, the devices 85 and 84 respectively give the values F0 and F15 of the function of correlation, respectively for the Walsh code W0 and for the Walsh code W15. If the generator 81 gives the Walsh code W1, the outputs of the devices 85 and 84 respectively give the correlation functions F1 and F14, respectively corresponding to the Walsh code W1 and the Walsh code W14. The demodulator, therefore, at a given instant, can only detect two of the sixteen Walsh codes, but this is enough for certain applications and, at the same time, enables great simplification of the computing device 83 as will be seen further below.

The computing device 83 has 16 eight-bit inputs respectively connected to 16 outputs of the chain 42' of correlation macro-cells. These inputs respectively receive the values CPI0',..., CPI15' of the functions of partial correlation of the carrier I with the reference signal and then the values CPQ0',..., CPQ15', of the functions of partial correlation of the carrier Q with the reference signal. The device 83 has two eight-bit outputs, respectively connected to an input of the device 85 to give it a value FIi, then a value FQi of the function of correlation of the carrier I and the carrier Q, respectively for the Walsh code Wi; and a second output connected to an input of the device 84 to give it a value FIh then a value FQh of the function of correlation of the carrier I and the carrier Q respectively for the Walsh code Wh.

The device 85 demultiplexes the values FIi and FQi, and then computes the modulus of a vector having these values as components. This modulus constitutes the value Fi of the function of correlation of the complex signal to be demodulated. The value Fi is given at an input of a device 90 for the detection of a maximum.

The device 84 demultiplexes the values FIh and FQh, then computes the modulus of a vector having these values as components. The value Fh of this modulus constitutes the value of the correlation function of the complex signal to be demodulated for the Walsh code Wh. The value Fh is applied to a second input of the device 90. The device 90 has two outputs, respectively connected to two output terminals 86 and 87 of the demodulator, to respectively give two values j and Fj which are, respectively, the index and the value of the greater of the two values Fi and Fh. The value j which can be equal only to i or h, represents a transmitted piece of data. The devices 83, 84, and 85 are controlled by a clock signal CKS', at a rate which is twice the sampling rate of each of the carriers I and Q. The clock signal CKS' is given by a standard generator of clock signals, not shown in FIG. 7.

Figure 8:
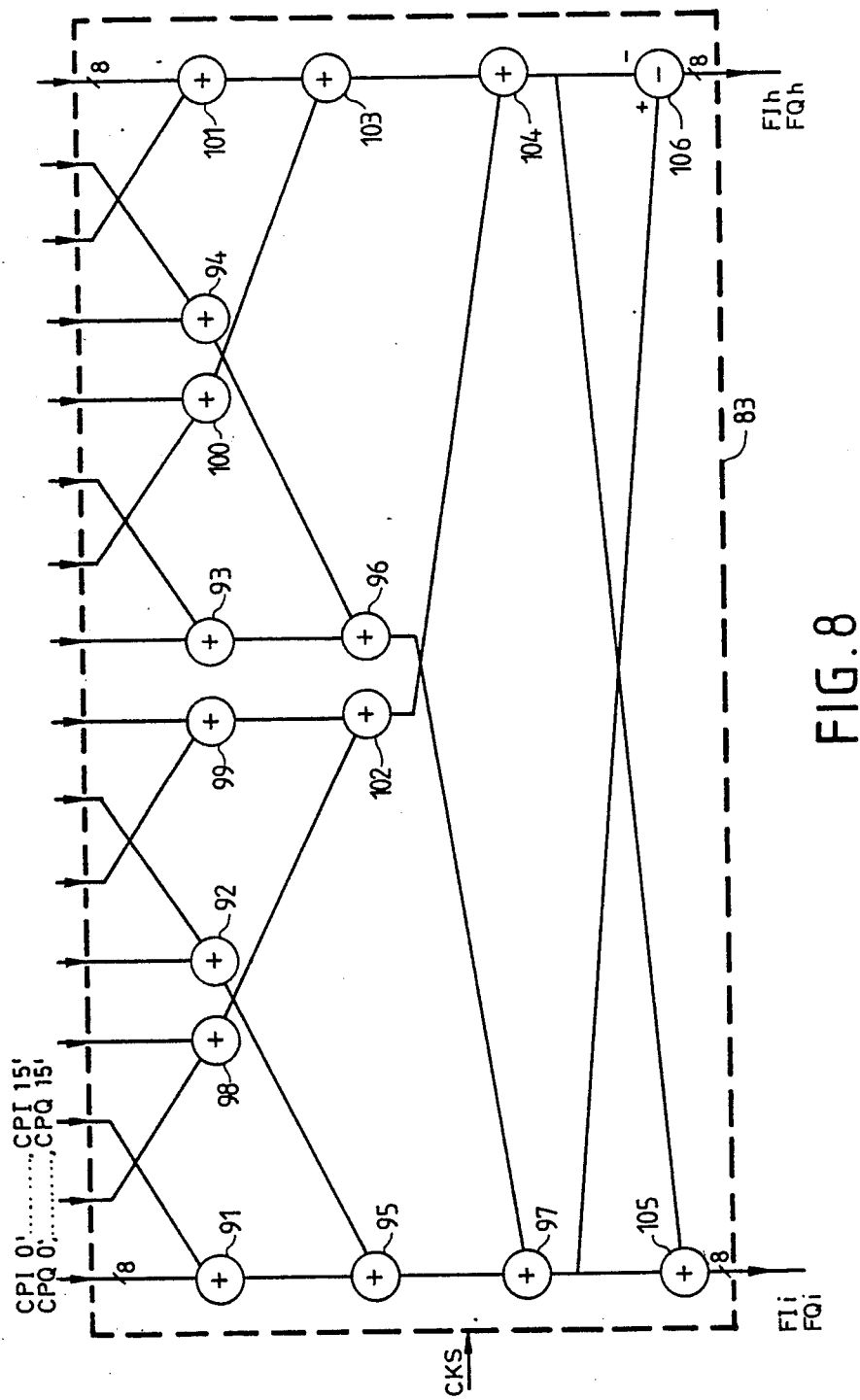
FIG. 8 shows a block diagram of a computing device belonging to this embodiment.

FIG. 8 is a block diagram of the linear combinations computing device 83. It has a pipeline structure comprising four lines of operators which are all adders, except one which is a subtractor. Each operator is followed by a register which is controlled by the clock signal CKS' and is not shown in the figure.

The first row of operators has four adders, 91 to 94, each achieving the sum of two values of partial correlation functions of even rank, and has four adders 98 to 101 each achieving the sum of two values of partial correlation functions of odd rank.

The second row of operators has an adder 95 that adds up the intermediate values given by the operators 91 and 92, an operator 96 adding up the intermediate values given by the adders 93 and 94, an adder 102 adding up the intermediate values given by the adders 98 and 99, and an adder 103 computing the sum of the intermediate values given by the adders 100 and 101.

The third row has an adder 97 which computes the sum of the intermediate values given by the adders 95 and 96; and includes an adder 104 which computes the sum of the intermediate values given by the adders 102 and 103.

The fourth row has an adder 105 which computes the sum of the intermediate values given by the adder 97 and by the adder 104; and has a subtractor 106 which computes the difference between the intermediate value given by the adder 97 and the intermediate value given by the adder 104.

It can be easily verified that the adder 105 thus gives a value equal to the sum of all the values of functions of partial correlation applied to the inputs of the device 83, while the substractor 106 gives the value of the difference between the sum of the values of the functions of partial correlation having a even rank and the sum of the functions of partial correlation having an odd rank. The output of the adder 105 is the output of the device 83 which gives the value FIi, then the value FQi, of the function of correlation of the carrier I and the carrier Q, respectively, for the Walsh code Wi. The output of the subtractor 106 forms the output of the device 83 which gives the value FIh, then the value FQh, of the function of correlation of the carrier I and the carrier Q, respectively, for the Walsh code Wh.

As can be seen in the diagram of FIG. 8, the computing device 83 is simpler to make than the computing device 32 shown in FIG. 6. The second type of demodulator has a diagram which is simple enough for it to be integrated
entirely in a single integrated circuit, using a known technology enabling the etching of lines with a width of 1.25 microns. It therefore provides for far simpler making than is the case with the standard correlating devices described above.

The invention can be applied, in particular, to the making of MSK, PSK or OQPSK modulators, with spread spectrum and and M-ary orthogonal coding for aeronautical on-board equipment which has to be has compact as possible.

What is claimed is:
1. An asynchronous, digital correlator to correlate a binary reference signal (REF) with a complex signal formed by a first carrier and second carrier (I, Q), modulated by a pseudo-random function and by an M-ary orthogonal encoding, said two carriers being sampled and digitized, said correlator comprising:
a multiplexer to transmit, alternately, a value (I) of the first carrier, and a value (Q) of the second car- rier, with a period equal to half their sampling period;

a first digital filter adapted to the pseudo-random function (PN), comprising a chain of registers to store L consecutive bits of the reference signal (REF) and a chain of M correlation macro-cells receiving the sequence of multiplexed values of the first carrier and the second carrier (I and Q), each macro-cell computing the value (CPI0,..., CPI15) of a first function, called a partial correlation function, between N bits of the reference signal and N values of the first carrier (I), and then computing the value (CPQ0,..., CPQ15) of a second function, called a partial correlation function, between N bits of the reference signal and N values of the second carrier (Q), N being equal to L/M;

a second digital filter adapted to at least one of the M-ary encoding codes and having computation means to determine the value of at least one linear combination of the values of the first functions of partial correlation (CPI0,... CPI15); and then to determine the value of a linear combination of the values of the second functions of partial correlation (CPQ0,..., CPQ15), the coefficients of the linear combination being unchanged and being equal to ±1; and having means to demultiplex the values of the two linear combinations (FIi, FQi), and to determine the modulus (Fi) of a vector having, as its components, the values of these two linear combinations (FIi, FQi).

2. A correlator according to claim 1, wherein each correlation macro-cell has a systolic structure comprising: a plurality of rows of N correlation cells, each cell receiving a bit (X0,..., X3) of multiplexed values (I, Q) and retransmitting this bit to a neighbouring cell in the same row, with a delay equal to a sampling half-period; receiving a bit (R15, R15,..., R0, R0) of the reference signal and retransmitting this bit to a homologous cell in the previous line; giving, with a delay equal to one sampling half-period, a carry-over bit (Cout) to a homologous cell in the following row; receiving a partial correlation result bit (Sin), given by the following cell in the same row; giving, with a delay equal to a sampling half-period, a partial correlation result bit (Sout), to the cell that precedes it in the same row;

and wherein each row of N correlation cells further comprises:

a chain of registers to delay the partial correlation result bit (S0,..., S7) that it gives, with a delay depending on the rank of the row in the macro-cell;

a chain of registers to delay the bit (X0,..., X3) of the multiplexed values (I, Q) that it receives, by a delay which is a function of the rank of the row in the macro-cell.

3. A correlator according to claim 2, wherein each correlation cell has:

an exclusive-NOR gate, of which one input receives a bit (Xin) of a value (I, Q) of the multiplexed signals, and one input receives a bit (R) of the reference signal;

a flip-flop retransmitting said bit (Xin) of a value of the multiplexed signals, under the control of a clock signal (CKS) at a frequency which is twice the sampling frequency;

an adder, of which one input is connected to the output of the exclusive-NOR gate; one output receives a partial correlation result bit (Sin) given by the following cell on the same line; and one output receives a carry-over bit (Cin) given by the homologous cell in the previous line;

a flip-flop retransmitting a partial correlation result bit (Sout) given by a first output of the adder, under the control of the clock signal (CKS);

a flip-flop retransmitting a carry-over bit (Cout) given by a second output of the adder, under the control of the clock signal (CKS).

4. A digital demodulator to demodulate a complex signal consisting of a first carrier and a second carrier (I, Q), in quadrature, which has its spectrum spread by a pseudo-random function and which is modulated by an M-ary orthogonal encoding, according to a PSK or MSK or QPSK modulation;

wherein the correlator according to any one of the claims 1 to 3, receives a reference signal (REF) formed by a pseudo-random signal (PN) identical to the one that has been used to spread the spectrum and given by a pseudo-random signal generator;

and wherein the second filter has means: to compute the values (FIn, FQn) of a first linear combination and a second linear combination of functions of partial correlation, to demultiplex these two values and to compute the modulus (Fn) of a vector having, as its components, these two values, for each of the M M-ary codes;

and further comprising means to determine the greatest modulus (Fj) from among these M moduli and to deduce, therefrom, that code (j) which modulates the two carriers (I, Q).

5. A digital demodulator to demodulate a complex signal formed by a first carrier and a second carrier, in quadrature, the spectrum of which is spread by a pseudo-random function, and which are modulated by an M-ary orthogonal encoding, according to a PSK or MSK or QPSK modulation;

comprising:

a correlator according to any one of the claims 1 to 3;

a generator giving a pseudo-random, binary signal identical to the one that has been used to spread the spectrum;

a generator of M-ary orthogonal codes, giving a binary signal according to one of these codes;

an exclusive-OR gate to give the correlator a reference signal (REF') formed by the product of the binary signals (PN, Wi) respectively given by the two generators;

and wherein the second filter of the correlator has means to compute the values (FIi, FQi) of a first linear combination and a second linear combination of functions of partial correlation; to demultiplex these two values and to compute the modulus (Fn) of a vector having, as its components, these two values, for at least one of the M M-ary codes (Wi, Wh).

6. A demodulator according to claim 5, to demodulate a complex signal formed by a first carrier and a second carrier (I, Q), in quadrature, the spectrum of which is spread by a pseudo-random function, and which are modulated by an M-ary Walsh encoding, wherein the computing means to sucessively compute the value (FIi, FQi) of a first linear combination and a second linear combination of the functions of partial correlation (CPI0',..., CPI15', CPQ0',..., CPQ15') comprise:

a plurality of adders to add all the values (CPI0', CPI2',..., CPI14'; CPQ0', CPQ2', CPQ14') of the functions of partial correlation having even rank;

a plurality of adders to add all the values (CPI1', CPI3',..., CPI15'; CPQ1', CPQ3', CPQ15') of the functions of partial correlation having odd rank;

an adder to add the values given by these two pluralities of adders and thus successively give the value (FIi, FQi) of a first component and a second component of the function of correlation for a first Walsh code (Wi) which is the one given by the generator of codes;

a subtractor to subtract, from one another, the values given by the two pluralities of adders and thus successively give the value (FIh, FQh) of a first component and a second component of the function of correlation for a second Walsh code (Wh).

* * * * *